(12) United States Patent
Bourgeois

(10) Patent No.: US 7,491,359 B2
(45) Date of Patent: *Feb. 17, 2009

(54) DELAMINATION-RESISTANT MULTILAYER CONTAINER, PREFORM, ARTICLE AND METHOD OF MANUFACTURE

(75) Inventor: Philip D. Bourgeois, Perrysburg, OH (US)

(73) Assignee: Graham Packaging PET Technologies Inc., York, PA (US)

( * ) Notice: Subject to any disclaimer, the term of this patent is extended or adjusted under 35 U.S.C. 154(b) by 215 days.

This patent is subject to a terminal disclaimer.

(21) Appl. No.: 10/688,432

(22) Filed: Oct. 16, 2003

(65) Prior Publication Data

US 2005/0084635 A1    Apr. 21, 2005

(51) Int. Cl.
*B29C 49/22* (2006.01)
(52) U.S. Cl. ..................................... 264/513
(58) Field of Classification Search .............. 264/513
See application file for complete search history.

(56) References Cited

U.S. PATENT DOCUMENTS

| | | | |
|---|---|---|---|
| 4,041,005 A | 8/1977 | Talsma et al. | |
| 4,526,821 A * | 7/1985 | McHenry et al. | 206/524.6 |
| 4,990,301 A | 2/1991 | Krishnakumar et al. | |
| 5,077,111 A | 12/1991 | Collette | |
| 5,102,699 A | 4/1992 | Beeson et al. | |
| 5,156,904 A | 10/1992 | Rice et al. | |
| 5,196,469 A | 3/1993 | Cushing et al. | |
| 5,246,753 A | 9/1993 | Koyama et al. | |
| 5,248,364 A * | 9/1993 | Liu et al. | 156/244.11 |
| 5,284,892 A | 2/1994 | Brodie, III et al. | |
| 5,350,622 A | 9/1994 | Speer et al. | |
| 5,362,784 A | 11/1994 | Brodie, III et al. | |
| 5,380,587 A | 1/1995 | Musclow et al. | |
| 5,382,473 A | 1/1995 | Musclow et al. | |
| 5,453,326 A | 9/1995 | Siddiqui | |
| 5,453,462 A | 9/1995 | Watanabe et al. | |
| 5,489,455 A * | 2/1996 | Nugent et al. | 428/36.91 |
| 5,512,338 A | 4/1996 | Bianchini et al. | |
| 5,573,819 A * | 11/1996 | Nugent et al. | 428/34.8 |

(Continued)

FOREIGN PATENT DOCUMENTS

EP    0526977    2/1993

(Continued)

OTHER PUBLICATIONS

RD 282006A, Oct. 1987.*

(Continued)

*Primary Examiner*—Suzanne E. McDowell
(74) *Attorney, Agent, or Firm*—Rissman Jobse Hendricks & Oliverio LLP

(57) ABSTRACT

A plastic container, preform or article includes a multilayer wall having at least one layer of matrix resin, at least one layer of barrier resin, and an adhesion-promoting material blended with the barrier resin and/or the matrix resin to promote bonding between the barrier and matrix layers. The matrix resin preferably is an ester-containing resin, most preferably a polyester such as PET. The adhesion-promoting material includes an amine polymer, preferably an imine polymer having a plurality of available primary, secondary or tertiary amine groups. An alkylene imine polymer is preferred, particularly a polyethyleneimine polymer.

18 Claims, 6 Drawing Sheets

U.S. PATENT DOCUMENTS

| | | | |
|---|---|---|---|
| 5,604,042 A | 2/1997 | Bianchini et al. | |
| 5,660,761 A | 8/1997 | Katsumoto et al. | |
| 5,700,554 A | 12/1997 | Roberts et al. | |
| 5,759,653 A | 6/1998 | Collette et al. | |
| 5,766,751 A | 6/1998 | Kotani et al. | |
| 5,779,954 A | 7/1998 | Tinant et al. | |
| 5,804,670 A | 9/1998 | Stoeppelmann | |
| 5,854,326 A | 12/1998 | Sakaya et al. | |
| 5,866,649 A | 2/1999 | Hong et al. | |
| 5,942,297 A | 8/1999 | Speer et al. | |
| 6,025,059 A | 2/2000 | McGee et al. | |
| 6,042,908 A | 3/2000 | Long et al. | |
| 6,057,013 A | 5/2000 | Ching et al. | |
| 6,106,950 A | 8/2000 | Searle et al. | |
| 6,132,822 A | 10/2000 | Overcash et al. | |
| 6,287,653 B1 | 9/2001 | Speer et al. | |
| 6,323,288 B1 | 11/2001 | Ching et al. | |
| 6,436,498 B1 | 8/2002 | Rangwalla et al. | |
| 6,514,660 B1 | 2/2003 | Majumdar et al. | |
| 6,525,123 B1 | 2/2003 | Yang et al. | |
| 6,565,938 B1 | 5/2003 | Toyosumi et al. | |
| 6,677,013 B1 * | 1/2004 | Curie et al. | 428/35.7 |
| 2002/0098269 A1 | 7/2002 | Bank et al. | |
| 2003/0022974 A1 | 1/2003 | Tai et al. | |
| 2003/0044553 A1 | 3/2003 | Ramanathan et al. | |
| 2003/0235708 A1 | 12/2003 | Yang et al. | |
| 2004/0076779 A1 * | 4/2004 | Bourgeois | 428/35.7 |

FOREIGN PATENT DOCUMENTS

| | | | |
|---|---|---|---|
| EP | 0732363 A | 9/1996 | |
| EP | 0732363 A | 9/1996 | |
| EP | 1102336 | 5/2001 | |
| EP | 1188552 A | 6/2001 | |
| EP | 1188552 A | 3/2002 | |
| EP | 1253171 | 10/2002 | |
| FR | 2752452 A | 2/1998 | |
| FR | 2752452 A | 2/1998 | |
| JP | 61227821 A | 10/1986 | |
| JP | 05051508 | 3/1993 | |
| JP | 7067594 | 9/1993 | |
| WO | WO92/17541 | 10/1992 | |
| WO | WO96/01736 | 1/1996 | |
| WO | WO98/06779 | 2/1998 | |
| WO | WO98/31539 | 7/1998 | |
| WO | WO98/31719 | 7/1998 | |
| WO | WO 00/49072 | 8/2000 | |

OTHER PUBLICATIONS

Database WPI, Section Ch, Week 198647, Derwent Publication Ltd., GB; Class E36, AN 1986-308718 XP002303604 & JP 61 227821 A (Kawasaki Heavy Ind. Ltd.) Oct. 9, 1986 abstract.

Lupasol Product Range, Preliminary Technical Information, BASF (1996).

Lupasol G20 Waterfree, Product Information, BASF (2000).

Polyethyleneimine—Catalog of Technical Publications, Polymer Enterprises, Inc. (1995).

Epomin Bulletin, Nippon Shokubui Co., Ltd. (2000).

International Search Report and Wirtten Opinion mailed Nov. 15, 2005 in PCT Application No. PCT/US2004/022213.

International Search Report and Written Opinion mailed Oct. 11, 2004 in PCT Application No. PCT/US2004/015451.

International Search Report and Written Opinion mailed Dec. 1, 2005 in PCT Application No. PCT/US2005/025987.

* cited by examiner

DELAMINATION-RESISTANT MULTILAYER CONTAINER, PREFORM, ARTICLE AND METHOD OF MANUFACTURE

The present invention is directed to multilayer plastic containers, preforms, articles, and to methods of manufacturing such containers, preforms and articles.

BACKGROUND AND SUMMARY OF THE INVENTION

Multilayer plastic containers and preforms typically include one or more layers of plastic matrix resin such as polyethylene terephthalate (PET) alternating with one or more layers of barrier resin such as polyamide or ethylene vinyl alcohol (EVOH) to resist transmission of gas, water vapor and/or flavorants, including odorants and essential oils, through the container wall. An important property of containers of this type is interlaminar adhesion to resist delamination between or among the various layers during filling and handling of the containers by the container manufacturer and the product packager, and during use of the container by the consumer, and there is a need for increasing interlaminar adhesion without detrimentally affecting other container features, such as barrier properties and container clarity. It is therefore a general object of the present invention to provide a multilayer container, a container preform, a multilayer article of manufacture, a method of manufacture and a barrier resin blend having improved adhesion characteristics between the layers of the preform and the container made therefrom.

A plastic container in accordance with one presently preferred aspect of the invention includes a multilayer wall having at least one layer of matrix resin, at least one layer of barrier resin, and an adhesion-promoting material blended with the barrier resin and/or the matrix resin to promote bonding between the barrier and matrix layers. In the preferred embodiments of the invention, the adhesion-promoting material is blended with the barrier resin. The adhesion-promoting material is an amine polymer, preferably an imine polymer, having a plurality of available primary, secondary, or tertiary amine groups. Such polyamine polymers preferably are an alkylene imine polymer or an alkylene amine polymer. Alkylene imine polymers, particularly polyethyleneimine (PEI) polymers, are particularly preferred. PEI polymers are sold by Nippon Shokubai Co., Ltd. under the trade name Epomin, and the EPOMIN bulletin published by Nippon Shokubai Co., Ltd. is incorporated herein by reference.

The polyamines of the present invention are polymeric, either homopolymeric or copolymeric polyamines, and preferably is an alkylene amine polymer or an alkylene imine polymer having molecular weights of from about 150 to about 2,000,000, with about 150 to about 400,000 preferred, and most preferred being from about 300 to about 80,000. Examples of polyamines useful for the invention include polyvinyl amines, aminofunctional polyacrylamides, poly-DADMAC's, polyvinyl pyrrolidone copolymers, polyethyleneimine, polypropyleneimine and the reaction product of ethylene diamine and epichlorohydrin copolymers.

A preferred polyamine that can be used to achieve adhesion promoting characteristics is the class of polyamines referred to as polyalkylenimines, such as polyethyleneimine, which is readily available in a wide range of molecular weights and different degrees of branchings. Polyethyleneimines consist of a large family of water-soluble polyamines of varying molecular weight and degree of chemical modification. It is generally known that the polymerization of ethylenimine does not result in a polymer that is completely composed of units having a linear structure, but that also the degree of branching in polyethyleneimines depends on the acid concentration and the temperature during polymerization. Additional groups may be grafted onto polyethyleneimines using methods well known in the art to change other desirable physical and chemical properties. Preferred molecular weights of the polyethyleneimine are from about 150 to 80,000. Most preferred molecular weights of the polyethyleneimine are from about 300 to 80,000 for reasons of material viscosity. As an additional feature of the present invention, PEI polymers blended in the barrier or matrix layer can also interact with acidic gases such as carbon dioxide to provide enhanced acidic gas barrier polymers, to provide increased carbon dioxide barrier performance of the container. This is particularly useful in reducing carbon dioxide loss from the package when the resulting container is used to package carbonated beverages such as soft drinks or beer.

The matrix polymer preferably is an ester-containing polymer—i.e., polymers having an ester in the main polymer chain, ester moities grafted to the main polymer chain, or ester moities as side groups to the chain. Polyester resin is particularly preferred. The polyester resin may be any suitable polyester resin having an ester in the main polymer chain. Suitable polyesters include polyethylene terephthalate (PET), polybutylene terephthalate (PBT), polypropylene terephthalate (PPT), polyethylene naphthalate (PEN), polyglycolic acid (PGA), polycarbonate (PC) and polylactic acid (PLA). Other suitable matrix polymers include polyacrylates such as polymethyl methacrylate (PMMA), polyethylene methacrylate (PEMA) and vinyl acetates. Also usable are blends and copolymers of the above, and process and post-consumer regrind that consists essentially of the above, or blends or copolymers of the above. PET-based resins, blends, copolymers and regrinds are particularly preferred. Other matrix polymers include polyolefins and polyamides.

The PEI polymers are known to carry a high cationic charge density by virtue of their incorporation of high amounts of primary, secondary and tertiary amine functionalities. While not being bound to any particular theory, it appears that these amine functionalities strongly interact with esters or other functional groups to achieve improved adhesion between the barrier and ester-containing layers to reduce or prevent delamination of the wall layers during handling and use of the containers.

The barrier resin preferably is selected from the group consisting of EVOH, polyamide, acrylonitrile copolymers, blends of EVOH and polyamide, nanocomposites of EVOH or polyamide and clay, blends of EVOH and an ionomer, acrylonitrile, cyclic olefin copolymers, polyvinylidene chloride (PVDC), polyglycolic acid (PGA), and blends thereof. EVOH and meta-xylylenediamine (MXD) polyamide are particularly preferred. The invention thus achieves improved adhesion between the barrier and polyester layers to reduce or prevent delamination of the wall layers during handling and use of the containers.

Other aspects of the invention include a plastic container preform, methods of making a plastic container and a preform, a barrier resin blend, and a multilayer article and method of manufacture in accordance with the invention.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 2A:
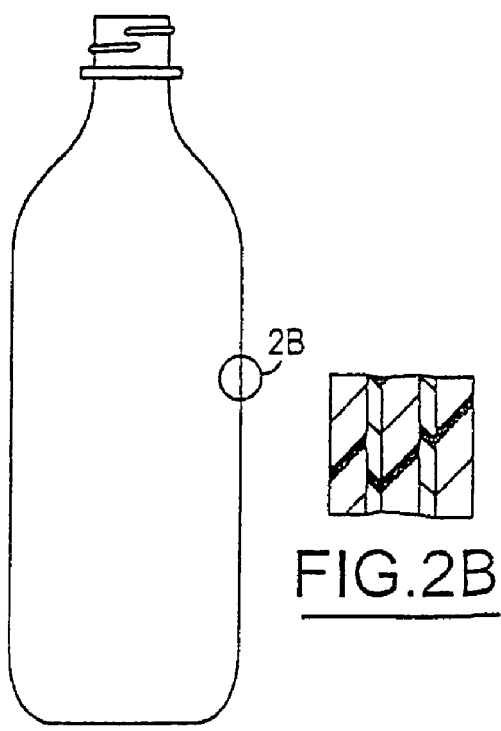
FIGS. 2A and 2B are schematic diagrams of a plastic container in accordance with another aspect of the invention.
Figure 2B:
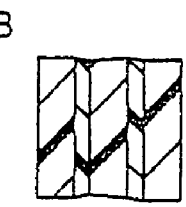

Containers and preforms in accordance with the present invention have a multilayer wall with at least one layer of matrix resin alternating with at least one layer of barrier resin. (Additional layers not germane to the present invention may also be included, such as post consumer resin layers.) For example, a three-layer container or preform may have a wall with layers in the sequence polyester/barrier/polyester. A five-layer container or preform may have wall layers in the sequence polyester/barrier/polyester/barrier/polyester. The barrier layer or layers may extend throughout the bottom wall and the sidewall of the container or preform, or may be confined to a portion of the sidewall or base, for example. The barrier layers may or may not extend into the finish of the container or preform. FIGS. 2A and 2B are schematic illustrations of a five-layer container in accordance with an exemplary implimentation of the invention, the size and geometry being exemplary for illustrative purposes only. All exemplary test containers (and preforms) discussed in this application (except container (1) in table 1) are five-layer containers (and preforms). In accordance with one aspect of the present invention, an adhesion promoting material is blended with the barrier resin such as EVOH and/or the matrix resin such as polyester resin, preferably with the barrier resin, to promote adhesion between the barrier and polyester layers. This adhesion promoting material includes an alkylene amine polymer, of which an alkylene imine polymer is preferred, particularly a polyethyleneimine (PEI) polymer. Particularly preferred PEI polymers are EPOMIN (trade name) grade SP-012 polymers manufactured by Nippon Shokubai Co., Ltd. Other PEI polymers may be employed, including other EPOMIN polymers and PEI polymers marketed by other resin manufacturers such as BASF under the trade name LUPASOL.

The polyester resin preferably is selected from the group consisting of PET, PEN, blends and copolymers of PET and PEN, and process or post consumer regrind that consists essentially of PET, PEN, or blends or copolymers of PET and PEN. In the examples discussed in the present application, the resin is PET-based polyester.

The barrier resin is a thermoplastic material that has a low gas and/or water vapor transmission rate, and/or exhibits a high barrier to transmission of flavorants including odorants and essential oils. The following barrier resin materials are preferred: EVOH, polyamide (including amorphous polyamide and semicrystalline polyamide such as MXD6), acrylonitrile copolymers, blends of EVOH and polyamide, blends of polyester (e.g. PET) and polyamide, blends of EVOH and an ionomer, cyclic olefin copolymers, PGA, nanocomposites of EVOH or polyamide and clay, polyvinylidene chloride and blends thereof. EVOH and polyamide are particularly preferred. MXD6 polyamide and EVOH are employed as barrier resins in the examples discussed in this application. One or more other barrier compositions also may be employed.

It is currently preferred that the adhesion-promoting material be blended with the barrier resin. Because the barrier resin layers form a relatively small percentage by weight of the overall preform or container, a lesser quantity of adhesion-promoting material is required than if the adhesion-promoting material is blended with the matrix resin. However, the adhesion-promoting material could be blended with the matrix resin, or with both the matrix resin and the barrier resin, in accordance with the broadest aspects of the invention.

The adhesion-promoting material typically is in the form of a liquid, and preferably is blended with the barrier resin material prior to forming the multilayer preform or container. When using an EVOH barrier resin, this blending may be performed by high pressure liquid injection of the adhesion-promoting material into an extruder through which the barrier material is flowing, or by placing the barrier material into the same feed throat of the extruder in such a way that the adhesion-promoting material and the barrier resin do not come into contact until they are adjacent to the extruder screw. Alternatively, the high pressure liquid injection resin method or common feedthroat method described above for the introduction of the adhesion-promoting material to the EVOH barrier resin may be employed to make an adhesion-promoting material-EVOH master batch material that is subsequently pelletized by methods well known in the art. These masterbatch pellets can then be blended with the EVOH barrier resin at an appropriate dilution ratio prior to forming the multilayer preform or container. When using an MXD6 barrier resin, the liquid adhesion-promoting material additive may be blended with particles of the barrier material at room temperature before feeding the blend to an extruder.

The amount of adhesion-promoting resin usually is no more than is necessary to achieve the desired level of adhesion, as increasing the proportion of adhesion-promoting material may affect the viscosity or other properties of the resin with which it is blended. The amount of adhesion-promoting material blended with the barrier resin or the matrix resin preferably does not exceed about 10%, and preferably does not exceed 5% by weight of the blend used to form the multilayer article. In this regard, the adhesion-promoting material preferably is blended with the barrier resin and preferably does not exceed about 10% by weight of the blend. The amount of adhesion promoting material more preferably does not exceed about 5% by weight of the blend with the barrier resin used to form the multilayer articles. In many applications, the amount of the adhesion-promoting material does not exceed 2% or 3% by weight of the blend with the barrier resin. All blend percentages in this application are by weight unless otherwise indicated.

Figure 1A:
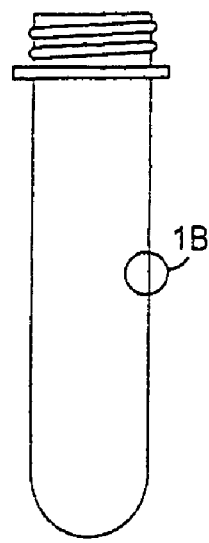
FIGS. 1A and 1B are schematic diagrams of a container preform in accordance with one aspect of the invention.
Figure 1B:
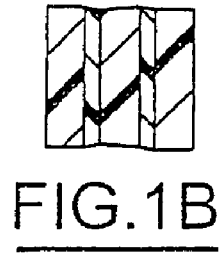

The process of container manufacture preferably involves manufacture of a preform, followed by blow molding the preform to form the container. In the examples discussed in this application, the preform is formed in a sequential injection molding operation of a type illustrated in U.S. Pat. Nos. 4,550,043, 4,609,516, 4,710,118 and 4,954,376. FIGS. 1A and 1B are schematic illustrations of a preform, the size and geometry being exemplary for illustrative purposes only. However, the preform can also be formed in a simultaneous injection molding operation of a type illustrated in U.S. Pat. Nos. 4,990,301 and 5,098,274, an over-molding operation of a type illustrated in U.S. Pat. No. 6,428,737, a compression molding operation of a type illustrated in U.S. published application 2002/0098310 using a mold charge that includes the polyester resin and the barrier resin/adhesion-promoting material blend, or in a coextrusion operation that produces a hollow tube having alternate layers of matrix resin and barrier resin blend. These specific citations are merely exemplary.

The preferred PEI adhesion-promoting materials promote bonding between matrix and barrier resin layers while the materials are in contact with at least one material at elevated melt temperature, and it is difficult to separate the layers of a preform after the preform has cooled. The presently preferred adhesion-promoting materials identified above are well suited for the chemistries of the disclosed barrier and matrix resins. The invention achieves improved adhesion between the barrier and matrix (e.g. polyester) layers to reduce or prevent delamination of the wall layers during handling and use of the multilayer articles, including preforms and containers.

Figure 3:
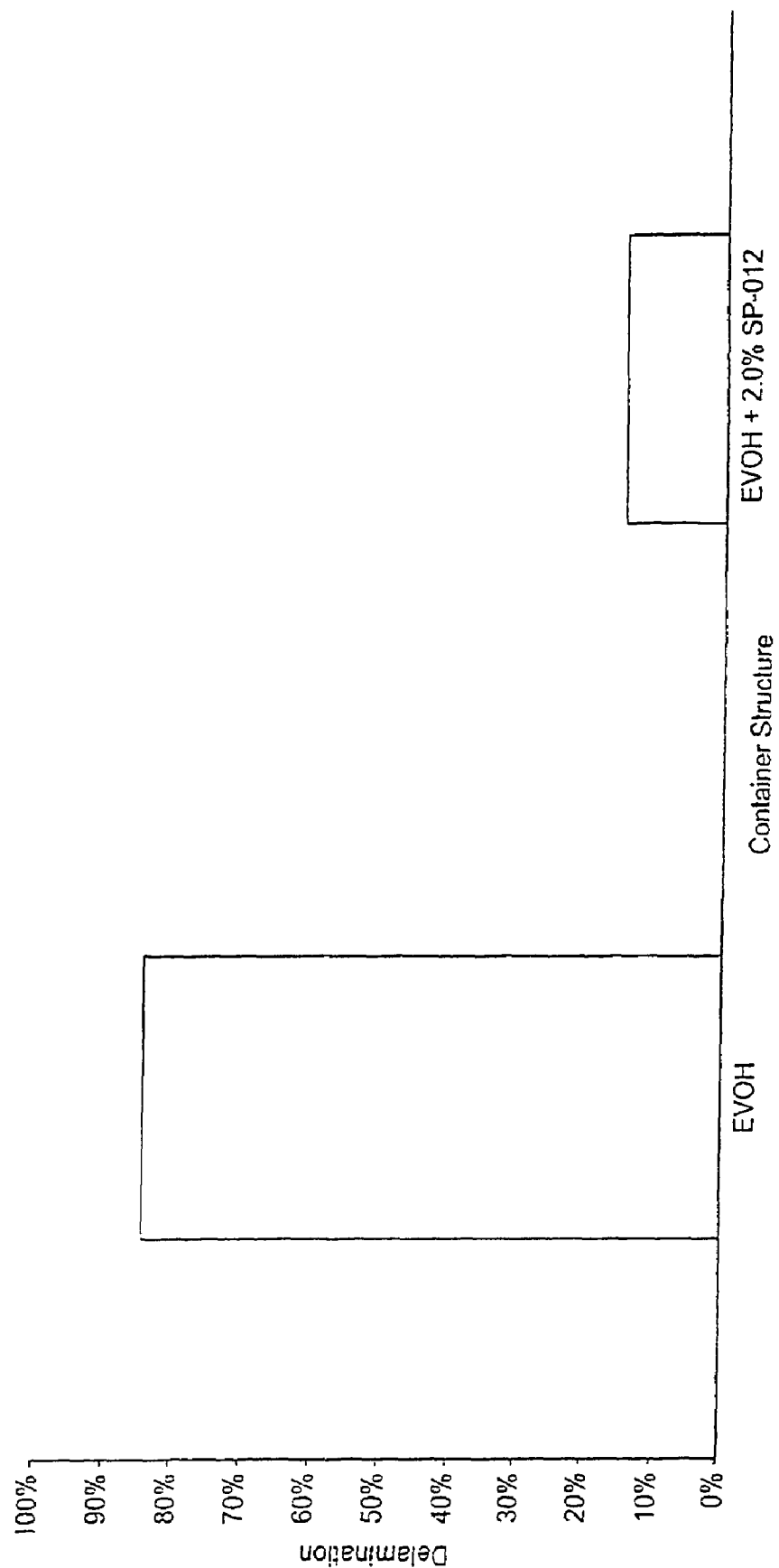
FIGS. 3 to 7 are graphic illustrations of test results on containers fabricated in accordance with exemplary embodiments of the invention.
Figure 4:
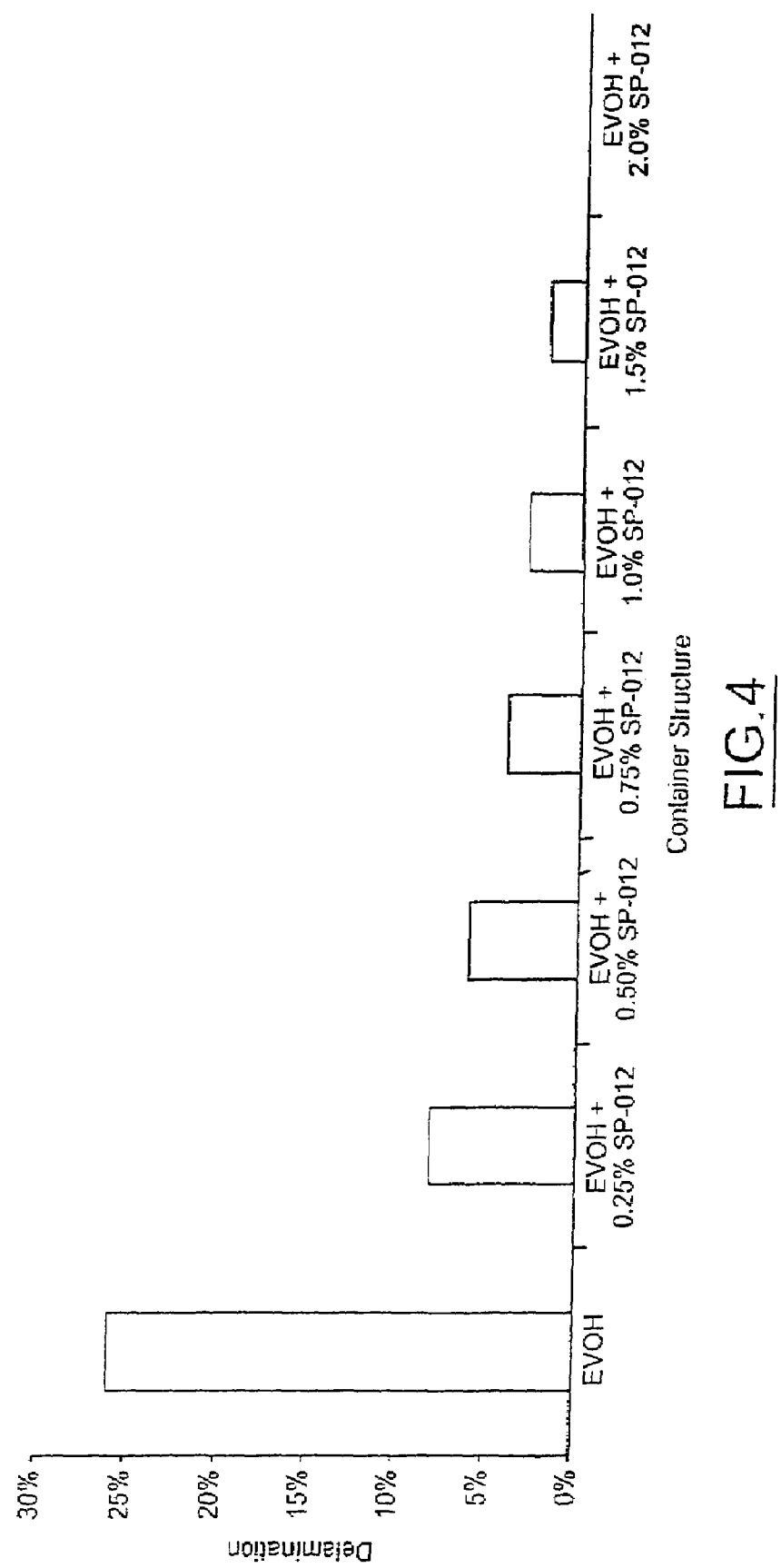
Figure 5:
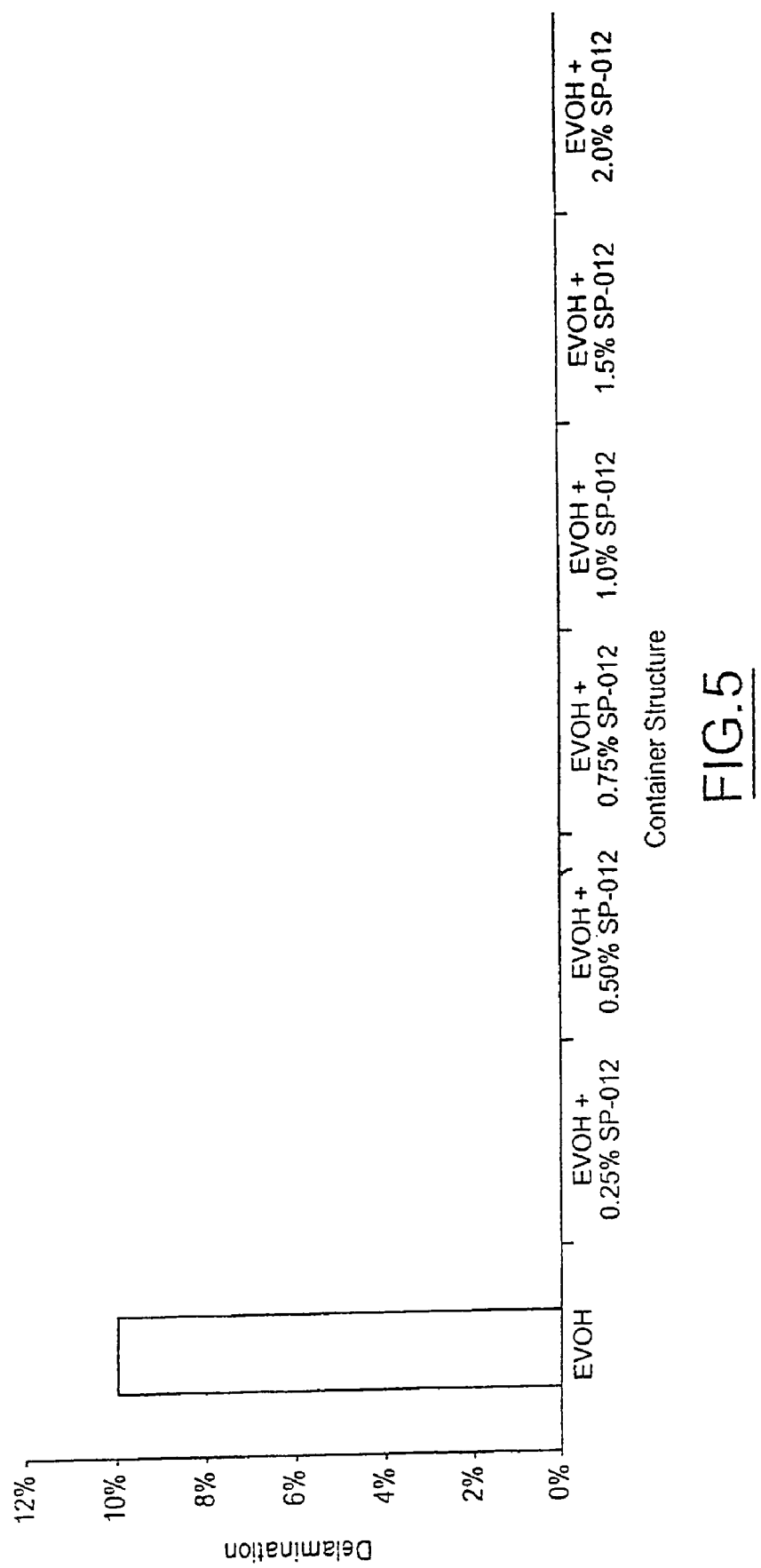

FIGS. 3–7 illustrate delamination test results on various container samples constructed in accordance with the present invention. Each container has a five-layer wall of PET/MXD6/PET/MXD6/PET configuration (FIGS. 6–7) or PET/EVOH/PET/EVOH/PET configuration (FIGS. 3–5). The test containers of FIG. 3 have nominal layer mil thicknesses of 6.5/0.25/11.5/0.25/6.5. These are averages measured at the center of wide panel areas of the sidewall. The test containers of FIGS. 4–7 have nominal sidewall mil thicknesses of 3/0.5/6/0.5/3 as discussed below. In all tests, the containers are experimental containers constructed for comparison purposes only. The tests are arbitrarily devised to obtain differentiation in data, and do not reflect any performance specification or conditions of use. In each figure, the ordinate indicates the percentage of containers in which delamination is observed by visual inspection as a result of the test, while the abscissa indicates the container structure, specifically the total amount of barrier material by weight and the amount of the adhesion-promoting material employed. With the exception of the amount of adhesion-promoting material and the type of barrier resin employed (EVOH or MXD6), all containers in each test are identical.

In all of the test described in this application, the adhesion-promoting material is a grade SP-012 PEI material marketed under the trade name EPOMIN by Nippon Shokubai Co., Ltd. This material has the following properties, according to the resin manufacturer:

| | |
|---|---|
| Molecular weight | 1200 (approx.) |
| Specific gravity | 1.05 @ 25° C. |
| Amine value | 19 mg eq./g solid |
| Freezing point | Less than −20° C. |
| Decomposition temp. | 290° C. |
| Flash point | 260° C. |
| Amine ratios | |
|    primary | 35% |
|    secondary | 35% |
|    tertiary | 30% |
| Chemical Abstract Specification (CAS) No. | 106899-94-9 |

The grade SP-012 material is stated by the manufacturer to be soluble in water and alcohol, partially soluble in ethyacetate, THF and toluene, and insoluble in n-hexane.

FIG. 3 illustrates the results of drop tests performed on twenty-four ounce containers having a rounded rectangular cross section. The containers are filled with water, in which a blue dye is added to facilitate visual identification of delaminations where they occurred. (The water/dye blend is used in all tests discussed in this application.) The barrier layers total 1.5% of the containers by weight, with the percentages of SP-012 indicated in FIG. 3 (and in FIGS. 4–7) being percentages of the total barrier layers —e.g., 2.0% of the 1.5% barrier layer or 0.03% adhesion-promoting material based upon the total weight of the container. The filled containers are dropped onto a cement base from a height of three feet so that the containers impact on their bottoms, and then are examined for delamination. As shown in FIG. 3, 84% of the containers show delamination without the SP-012 adhesion-promoting material in the barrier layers. The containers having EVOH blended with 2.0% SP-012 show delamination in only 14% of the containers.

FIGS. 4 and 5 illustrate side-impact test results on 400 ml cylindrical containers for carbonated soft drinks. This side-impact testing involve a single impact against the container sidewall with a steel wedge and with the container clamped in stationary position. The energy of the impact is approximately 3.3 joules. FIG. 4 illustrates test results with the containers filled with non-carbonated water, while FIG. 5 illustrates test results with the containers filled with water and carbonated at 4.2 GV (gas volumes). The barrier resin layers totaled 3% by weight of the containers. In the samples having a adhesion-promoting material, the adhesion-promoting material is progressively increased from 0.25% through 0.50%, 0.75%, 1.0%, 1.5% to 2.0% of the barrier layer weight. As can be seen in FIG. 4, the occurrence of delamination progressively decreased in the non-carbonated samples to no delamination at 2.0% SP-012. In the carbonated samples of FIG. 5, there is no delamination seen in the samples with the SP-012 adhesion-promoting material.

Figure 6:
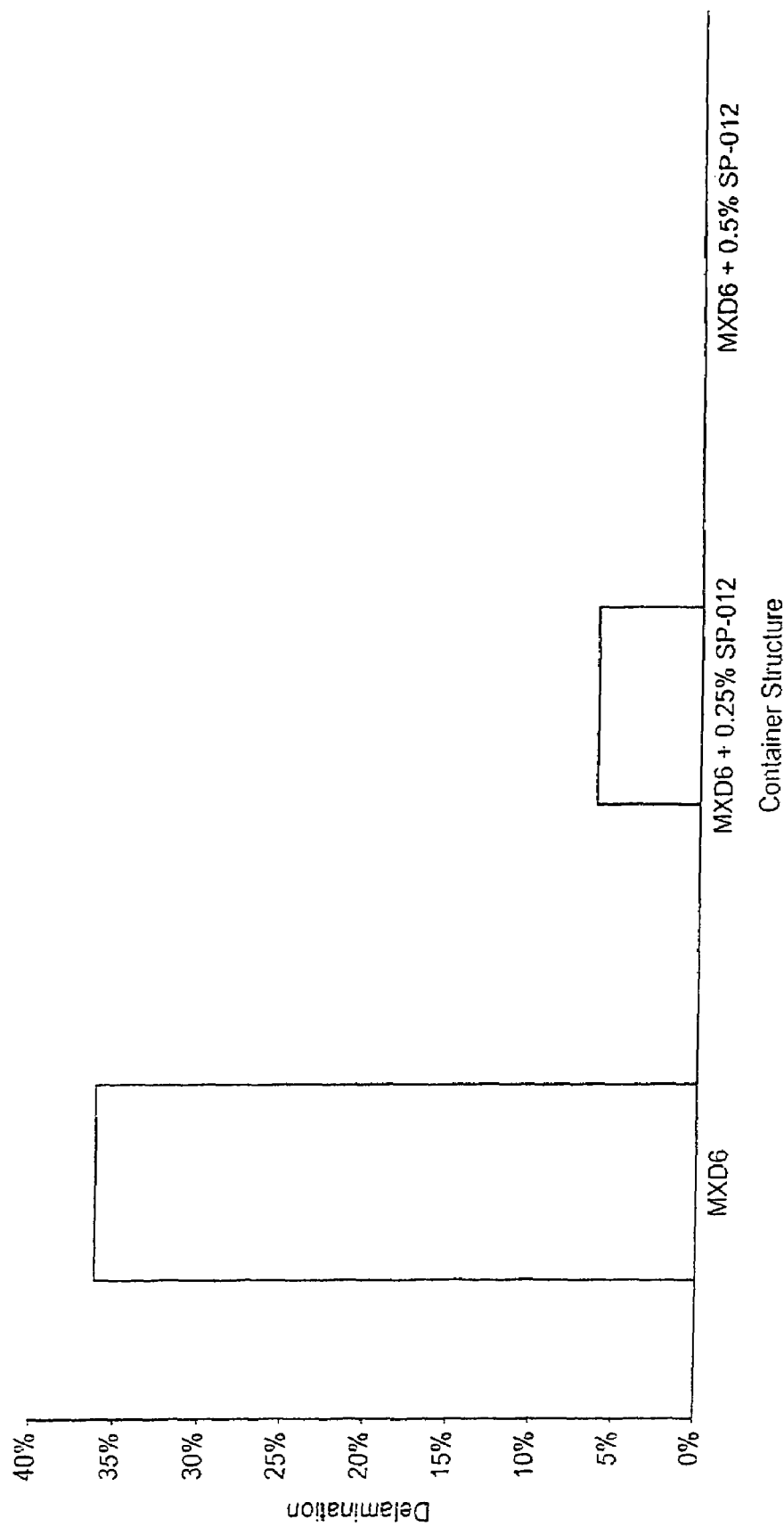
Figure 7:
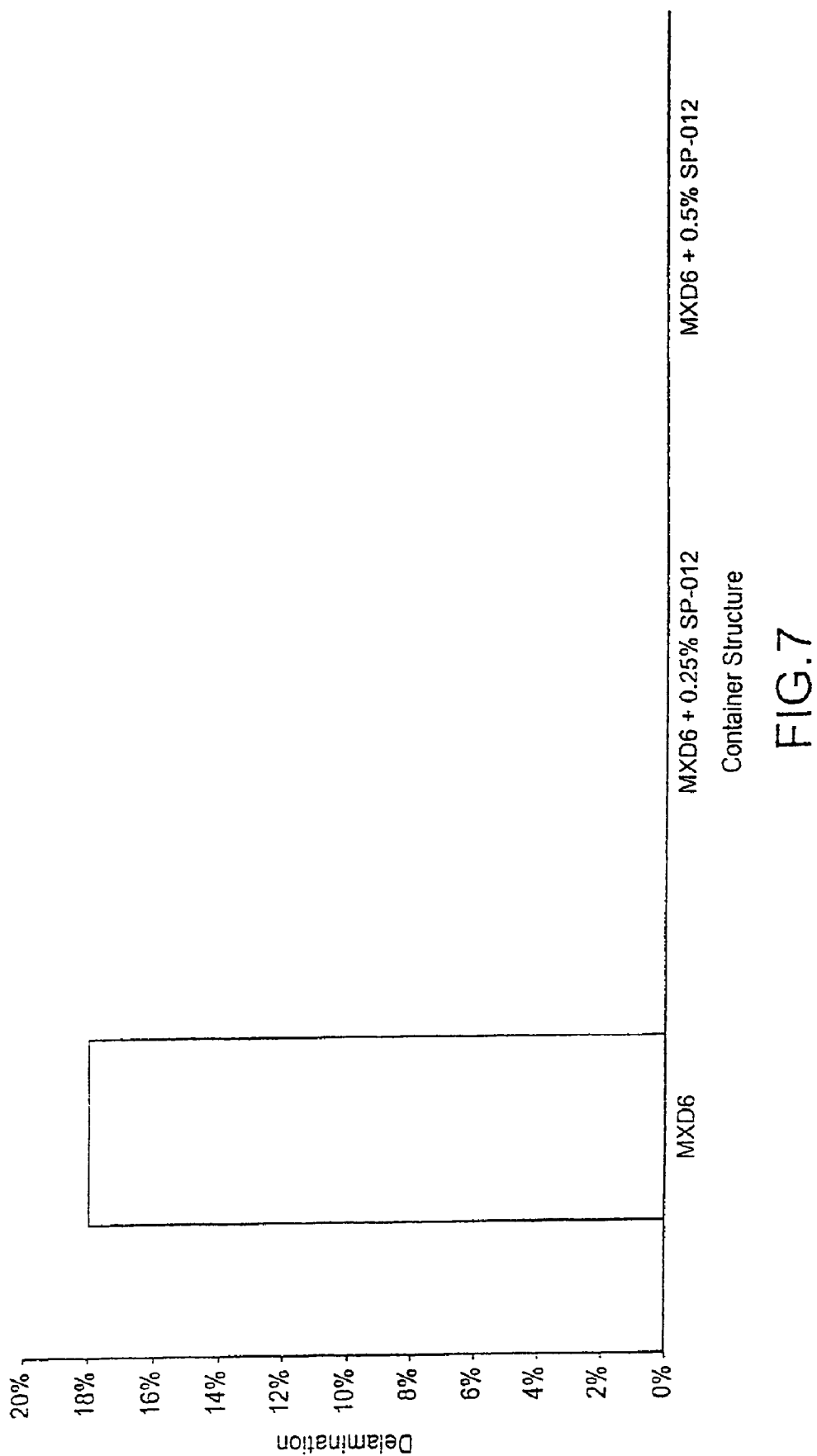

FIGS. 6 and 7 show the results of side-impact tests on 400 ml CSD containers under conditions respectively identical to those in connection with FIGS. 4 and 5. In the containers of FIGS. 6 and 7, however, MXD6 polyamide is used instead of EVOH as the barrier resin. In the non-carbonated packages of FIG. 6, occurrence of delamination decreases from about 36% to about 7% by addition of 0.25% SP-012, and no delamination is observed with 0.5% SP-012. In the carbonated packages of FIG. 7, no delamination is observed in any of the samples with the adhesion-promoting material.

As noted above, the PEI polymers that are presently preferred as adhesive-promoting agents also exhibit an enhanced barrier effect with acidic gases such as carbon dioxide, and can act to improve carbon dioxide barrier properties in the barrier layer in addition to their adhesive-promoting function. This is particularly advantagous in decreasing carbon dioxide loss when the container is used to package carbonated beverages such as soft drinks and beer.

The following table shows the increase in barrier properties associated with the PEI polymer, specifically EPOMIN SP-012 in these tests, where 28 mm 400 ml beverage containers are filled at 4.0 gas volumes of $CO_2$ by chemical carbonation techniques and are capped with 28 mm closures. These closures are polypropylene closures with ethylene vinyl acetate (EVA) liners as disclosed in U.S. Pat. No. 5,306,542. After being allowed to equilibrate for 14 days at 68F/50% RH storage, the total container $CO_2$ transmission rate is measured by placing the container within a sealed vessel with a known capture volume. The sealed vessel has two ports through which nitrogen carrier gas flowed in through one of the ports and exits the vessel from the other port. The exit port is directed to a Mocon C-IV $CO_2$ test machine for detecting the amount of $CO_2$. The quantity of $CO_2$ is measured for a period of time, from which the $CO_2$ transmission rate is determined.

With the exception of the monolayer PET container, each container has a five layer 13 mil nominal sidewall of PET/Barrier/PET/Barrier/PET of nominal mil thicknesses of 3/0.5/6/0.5/3, respectively. (The "monolayer" PET container was made using a five-layer process with all layers being PET.) In containers (2) through (9), the two "barrier" layers total 3% of the container weight, with the percentages of SP-012 being percentages of the total batter layers—e.g. 1% of the 3% barrier layers or 0.03% adhesion-promoting material based upon total container weight. The results in Table 1 are an average for five of each container. Containers (2) having polystyrene "barrier layers" exhibit poorer barrier properties than the monolayer PET container (1). However, the addition of PEI SP-012 significantly improves the $CO_2$ barrier properties of containers (3) and (4) as compared to containers (2). Blending with PEI SP-012 also significantly improved the $CO_2$ barrier properties of containers (7), (8) and (9) with the EVOH barrier layers as compared to containers (5), although the performance trends in these tests as a function of concentration of the PEI SP-012 appear to be variable.

TABLE 1

| | Container Construction | Transmission Rate in cc-$CO_2$/day |
|---|---|---|
| 1 | Monolayer PET | 4.55 |
| 2 | 3% Polystyrene | 4.81 |
| 3 | 3% (Polystyrene + 1% Epomin SP-012) | 4.25 |
| 4 | 3% (Polystyrene + 2% Epomin SP-012) | 3.8 |
| 5 | 3% EVOH | 2.48 |
| 6 | 3% (EVOH + 1% Epomin SP-012) | 2.5 |
| 7 | 3% (EVOH + 2% Epomin SP-012) | 1.69 |
| 8 | 3% (EVOH + 3% Epomin SP-012) | 1.76 |
| 9 | 3% (EVOH + 4% Epomin SP-012) | 1.87 |

In the Exemplary Containers:
  The PET resin is Cleartuf 8006 which is a PET copolymer having an intrinsic viscosity of 0.8 dl/g sold by M&G Polymer USA.
  The polystyrene is Chevron EA3400 having a melt index of 9 g/10 min according to ASTM D1238, condition G.
  The EVOH is Eval Company of America, Grade F171A which is 32 mol % ethylene content poly(ethylene vinyl alcohol) copolymer.

Indeed, in accordance with one aspect of the invention, an alkylene imine polymer may be employed in a monolayer or multilayer article, such as a monolayer PET container, to retard migration of carbon dioxide through the wall of the container. In this respect, the article may be a packaging component such as a container, or a closure in which the polymer is included in a closure liner and/or the closure shell.

There have thus been disclosed a multilayer container, a multilayer preform, a barrier resin blend for use in a multilayer container, a method of making a multilayer preform or container, and a method of making a multilayer plastic article of manufacture that fully satisfy all of the objects and aims previously set forth. The container, barrier blend and method of manufacture have been disclosed in conjunction with a number of exemplary embodiments thereof, and several modifications and variations have been discussed. Other modifications and variations will readily suggest themselves to a person of ordinary skill in the art. The invention is intended to embrace all such modifications and variations as fall within the spirit and broad scope of the appended claims.

The invention claimed is:

1. A method of making a multilayer plastic container that includes: (a) blending with a barrier resin, an adhesion-promoting material comprising alkylene imine polymer, and (b) forming a preform in which the blend formed in step (a) is in layers alternating with layers of polyester resin, and in which said alkylene imine polymer promotes adhesion between said barrier resin and said polyester resin.

2. The method set forth in claim 1 further including: (c) blow molding the preform formed in step (b) into a hollow plastic container.

3. The method set forth in claim 2 wherein said step (b) is carried out while at least one of said blend formed in said step (a) and said polyester resin is in melt phase.

4. The method set forth in claim 3 wherein said step (b) is carried out by a process selected from the group consisting of simultaneously injection molding said polyester resin and said barrier resin blend, sequentially injection molding said polyester resin and said barrier resin blend, overmolding sequential layers of said polyester resin and said barrier resin blend, compression molding a mold charge that includes said polyester resin and said barrier resin blend, and extruding a hollow tube that includes alternate layers of said polyester resin and said barrier resin blend.

5. The method set forth in claim 4 wherein said adhesion-promoting material is a polyethyleneimine polymer.

6. The method set forth in claim 5 wherein said polyester resin is PET, PEN, a blend or copolymer of PET and PEN, or reg rind that includes PET, PEN, or blends or copolymers of PET and PEN.

7. The method set forth in claim 1 wherein said barrier resin is EVOH, polyamide, an acrylonitrile copolymer, a blend of EVOH and polyamide, a blend of polyester and polyamide, a nanocomposite of EVOH or polyamide and clay, a blend of EVOH and an ionomer, acrylonitrile, a cyclic olefin copolymer, polyglycolic acid, polyvinylidene chloride, or blends thereof.

8. A method of making a multilayer plastic article which is a preform for blow molding a plastic container having a multilayer wall or a blow-molded plastic container having a multilayer wall, the method including: (a) blending with a barrier resin, an adhesion-promoting material comprising an amine polymer, and (b) forming an article in which the blend formed in step (a) is in layers alternating with layers of matrix resin comprising an ester-containing resin, and in which said amine polymer promotes adhesion between said barrier rsin and said matrix resin, wherein said step (b) is carried out while at least one of said blend formed in said step (a) and said matrix resin is in melt phase, and wherein said amine polymer is an alkylene imine polymer.

9. The method set forth in claim 8 wherein said alkylene imine polymer is a polyethyleneimine polymer.

10. A method of making a multilayer plastic article which is a preform for blow molding a plastic container having a multilayer wall or a blow-molded plastic container having a multilayer wall, the method including: (a) blending with a barrier resin, an adhesion-promoting material comprising an alkylene imine polymer, and (b) forming an article in which the blend formed in step (a) is in layers alternating with layers of matrix resin comprising an ester-containing resin, and in which said alkylene imine polymer promotes adhesion between said barrier resin and said matrix resin, wherein said ester-containing resin is a polyester resin and said barrier resin is polyamide or EVOH.

11. The method set forth in claim 10 wherein said matrix resin is a polyester resin.

12. The method set forth in claim 11 wherein said polyester resin is PET, PEN, a blend or copolymer of PET and PEN, or regrind that includes PET, PEN, or blends or copolymers of PET and PEN.

13. A method of making a multilayer plastic article which is a preform for blow molding a plastic container having a multilayer wall or a blow-molded plastic container having a multilayer wall, the method including: (a) blending with a barrier resin, an adhesion-promoting material comprising an alkylene imine polymer, and (b) forming an article in which the blend formed in step (a) is in layers alternating with layers of matrix resin comprising an ester-containing resin, and in which said alkylene imine polymer promotes adhesion between said barrier resin and said matrix resin, wherein said barrier resin is EVOH, polyamide, an acrylonitrile copolymer, a blend of EVOH and polyamide, a blend of polyester and polyamide, a nanocomposite of EVOH or polyamide and clay, a blend of EVOH and an ionomer, acrylonitrile, a cyclic olefin copolymer, polyglycolic acid, polyvinylidene chloride, or blends thereof.

14. A method of making an article, which includes:
blending an alkylene imine polymer with a barrier resin; and
positioning the blend adjacent an ester-containing resin to form said article that resists migration of carbon dioxide through a sidewall of said article.

15. The method set forth in claim 14 wherein said barrier resin is selected from EVOH, polyamide, acrylonitrile copolymers, a blend of EVOH and polyamide, a blend of polyester and polyamide, a nanocomposite of EVOH or polyamide and clay, a blend of EVOH and an ionomer, acrylonitrile, a cyclic olefin copolymer, polyglycolic acid, polyvinylidene chloride, or a blend thereof.

16. The method set forth in claim 15 wherein said sidewall is a multilayer wall having at least two plastic resin layers, and wherein said alkylene imine polymer is in one of said layers.

17. The method set forth in claim 16 wherein an other of said at least two layers includes polyester resin.

18. The method set forth in claim 14 wherein said alkylene imine polymer is a polyethyleneimine polymer.

* * * * *

UNITED STATES PATENT AND TRADEMARK OFFICE
CERTIFICATE OF CORRECTION

PATENT NO.       : 7,491,359 B2
APPLICATION NO.  : 10/688432
DATED            : February 17, 2009
INVENTOR(S)      : Bourgeois It is certified that error appears in the above-identified patent and that said Letters Patent is hereby corrected as shown below:

In claim 6, line 21, the following word should be corrected as follows:
"re grind" to "regrind"

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,491,359 B2 Page 1 of 1
APPLICATION NO. : 10/688432
DATED : February 17, 2009
INVENTOR(S) : Bourgeois It is certified that error appears in the above-identified patent and that said Letters Patent is hereby corrected as shown below:

Column 8, in claim 6, line 21, the following word should be corrected as follows: "re grind" to "regrind"

This certificate supersedes the Certificate of Correction issued April 14, 2009.

Signed and Sealed this

Fifth Day of May, 2009

JOHN DOLL
*Acting Director of the United States Patent and Trademark Office*